United States Patent
Schuessler

(10) Patent No.: US 7,663,486 B2
(45) Date of Patent: Feb. 16, 2010

(54) RFID TAG USER MEMORY INDICATION

(75) Inventor: Frederick Schuessler, Baiting Hollow, NY (US)

(73) Assignee: Motorola, Inc., Schaumburg, IL (US)

( * ) Notice: Subject to any disclaimer, the term of this patent is extended or adjusted under 35 U.S.C. 154(b) by 564 days.

(21) Appl. No.: 11/453,928

(22) Filed: Jun. 16, 2006

(65) Prior Publication Data

US 2008/0001723 A1     Jan. 3, 2008

(51) Int. Cl.
*G08B 13/14* (2006.01)
(52) U.S. Cl. .............. 340/572.1; 340/10.51; 340/10.52; 711/100
(58) Field of Classification Search .............. 340/572.1, 340/10.51, 10.52, 10.1, 5.65; 711/170, 155, 711/156, 100, 213, 171
See application file for complete search history.

(56) References Cited

U.S. PATENT DOCUMENTS

| | | | | |
|---|---|---|---|---|
| 5,942,987 | A * | 8/1999 | Heinrich et al. .......... | 340/10.42 |
| 5,966,082 | A * | 10/1999 | Cofino et al. ............ | 340/10.51 |
| 6,480,699 | B1 * | 11/2002 | Lovoi ........................ | 455/41.2 |
| 6,519,689 | B2 | 2/2003 | Manning | |
| 6,980,087 | B2 * | 12/2005 | Zukowski ................ | 340/10.51 |
| 2005/0099302 | A1 | 5/2005 | Lieffort et al. | |
| 2006/0087407 | A1 | 4/2006 | Stewart et al. | |
| 2006/0117066 | A1 | 6/2006 | Smith et al. | |
| 2006/0123055 | A1 | 6/2006 | Atkinson et al. | |

OTHER PUBLICATIONS

E-Mail Correspondence Re: Issues Surrounding U.S. Patent Application Publication 20080001723A1; from Rick Schuessler, dated, Jan. 8, 2009 12:36PM.
E-Mail Correspondence Re: Issues Surrounding U.S. Patent Application Publication 20080001723A1; from Rick Schuessler, dated, Jan. 7, 2009 4:28PM.
E-Mail Correspondence Re: Issues Surrounding U.S. Patent Application Publication 20080001723A1; from Rick Schuessler, dated, Jan. 7, 2009 5:41PM.
E-Mail Correspondence Re: Issues Surrounding U.S. Patent Application Publication 20080001723A1; from Craig K. Harmon, dated, Nov. 10, 2008 6:46PM.
E-Mail Correspondence Re: Issues Surrounding U.S. Patent Application Publication 20080001723A1; from Clive Hohberger, dated, Nov. 10, 2008 1:56 PM.
E-Mail Correspondence Re: Issues Surrounding U.S. Patent Application Publication 20080001723A1; from Dan Kimball, dated, Nov. 11, 2008 2:45AM.

(Continued)

*Primary Examiner*—Toan N Pham
(74) *Attorney, Agent, or Firm*—Bartholomew J. DiVita; Terri S. Hughes

(57) ABSTRACT

A system and method in a radio frequency identification (RFID) tag for writing and erasing user memory. A write command is received at the tag to write data into user memory of the tag. Based on receipt of the write command, a user memory flag in a first memory bank of the tag is set, and the data is written into a second memory bank of the tag. An erase command is received at the tag to erase data stored in the user memory of the tag. Based on receipt of the command to erase, the user memory flag in the first memory bank is cleared, and data stored in the second memory bank is erased.

26 Claims, 9 Drawing Sheets

OTHER PUBLICATIONS

E-Mail Correspondence Re: Issues Surrounding U.S. Patent Application Publication 20080001723A1; from Pat King, dated, Jan. 7, 2009 8:38 AM.
E-Mail Correspondence Re: Issues Surrounding U.S. Patent Application Publication 20080001723A1; from Farron Dacus, dated, Nov. 22, 2008 8:45 PM.
E-Mail Correspondence Re: Issues Surrounding U.S. Patent Application Publication 20080001723A1; from Rick Schuessler, dated, Nov. 24, 2008 10:49 AM.
E-Mail Correspondence Re: Issues Surrounding U.S. Patent Application Publication 20080001723A1; from Paul Chartier, dated, Nov. 24, 2008 6:12AM.
E-Mail Correspondence Re: Issues Surrounding U.S. Patent Application Publication 20080001723A1; from Barba Hickman, dated, Nov. 24, 2008 4:29 PM.
E-Mail Correspondence Re: Issues Surrounding U.S. Patent Application Publication 20080001723A1: from Craig K. Harmon, dated, Nov. 21, 2008 7:29 PM.
"B11/EPC Harmonization Proposal," dated, Dec. 7, 2005, Power Point Presentation.
"Data Capture Report", Feb. 10, 2006, Editor-Rick Morgan, Publisher—Larry W. Roberts, RMG Enterprises, pp. 4-6, Articles (2)—"AIAG Merges EPC and ISO for RFID Tire Tracking" and "Craig Harmon's Open Letter to the Industry: Regarding Joint AIAG B-11/EPCglobal proposal for the use of User Memory in 18000, part 6C" by Craig Harmon.
"B11/EPC Harmonization Proposal", Jan. 27, 2006, Powerpoint presentation.
EPCglobal, "Item-Level Tagging(ILT)Protocol Requirements Document Version 1.0.1", Jan. 16, 2006, powerpoint presentation, slides 1-19.
Stephen F. Roth, Letter to Morris Brown re: Harmonization of Tire RFID Standards, Feb. 1, 2006, p. 1.
Chris Diorio, "Logical Layer Gap Analysis", Air Interface Working Group, Apr. 10, 2006, powerpoint presentation, pp. 1-10.
Patrick King, Letter to Morris Brown re: Proposed changes to B11 Tire Standard, Jan. 31, 2006, p. 1.
EPCglobal, "Tag Data Standard Work Group", Sep. 15, 2005, powerpoint presentation, slides 1-10.
R. Schuessler, UHF Air Interface Work Group Minutes, Jun. 12, 2006, pp. 1-5.
G. Ow-Yang, UHF Air Interface Work Group Minutes, Jun. 19, 2006, pp. 1-6.
Search Report and Written Opinion for International Application No. PCT/US07/13271 mailed Mar. 13, 2008, 11 pages.
EPCglobal Standard, 'EPC(tm) Radio-Frequency Identity Protocols Class-1 Generation-2 UHF RFID Protocol for Communication at 860 MHz-960MHz, Version 1.1.0', Published Dec. 17, 2005. [retrieved on Jan. 17, 2008]. Retrieved from the Internet: <URL: http://www.epcglobalinc.org/standards/uhfclg2/uhfc1g2__1__1__0-standard-20071017.pdf>; entire document, foreword and p. 37 (first paragraph) and p. 58 (table 6.30).
Craig Harmon, Letter communication regarding EPC Gen2 v1.0.9 or 18000, part 6c, Feb. 1, 2006.
Draft "AIAG Work Item Proposal" regarding use of User Memory, pp. 1-4, Feb. 1, 2006.

* cited by examiner

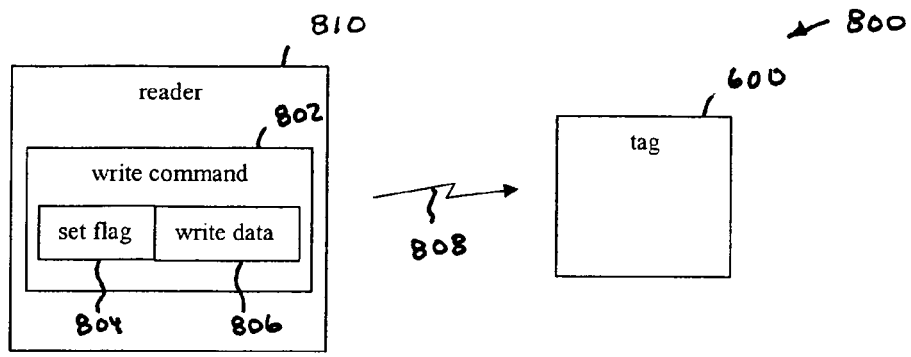
FIG. 8
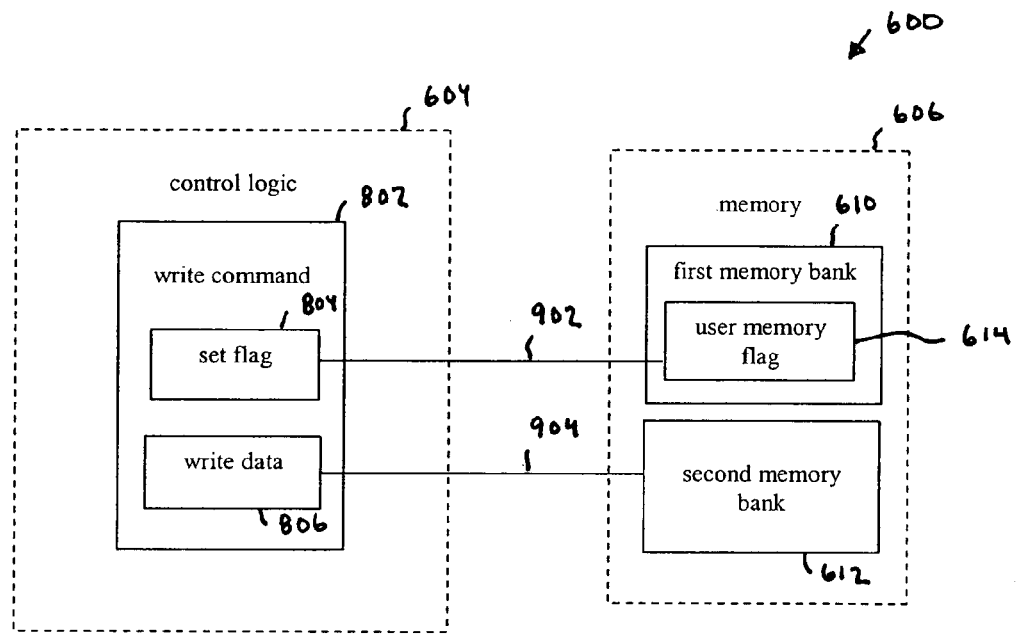
FIG. 9
1002
a write command is received that specifies a write of the data into the second memory bank and a set of a bit of the first memory bank that represents the user memory flag
FIG. 10

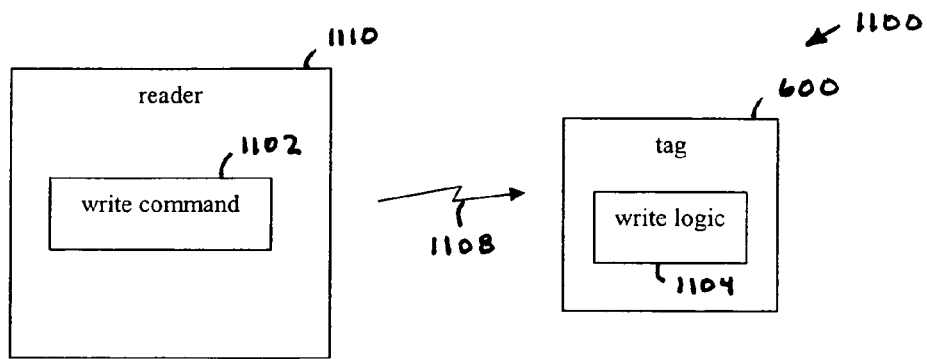
FIG. 11
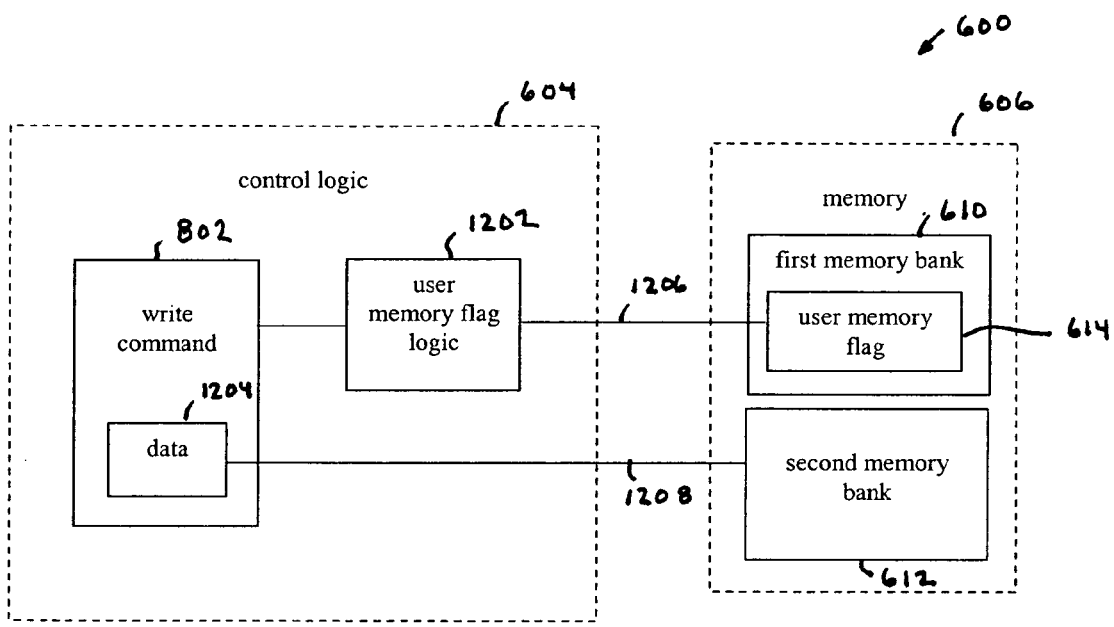
FIG. 12
> wherein receipt of the data for user memory in the write command causes logic of the tag to perform step 704 ⟵ 1302
FIG. 13 the user memory flag in the first memory bank is set if it is determined that the second memory bank stores no data prior to step 706

RFID TAG USER MEMORY INDICATION

BACKGROUND OF THE INVENTION

1. Field of the Invention

The invention relates to radio frequency identification (RFID) technology, and in particular, to efficient writing of data into user memory of RFID tags.

2. Background Art

Radio frequency identification (RFID) tags are electronic devices that may be affixed to items whose presence is to be detected and/or monitored. The presence of an RFID tag, and therefore the presence of the item to which the tag is affixed, may be checked and monitored wirelessly by devices known as "readers." Readers typically have one or more antennas transmitting radio frequency signals to which tags respond. Because the reader "interrogates" RFID tags, and receives signals back from the tags in response to the interrogation, the reader is sometimes termed as "reader interrogator" or simply "interrogator."

With the maturation of RFID technology, efficient communication between tags and interrogators has become a key enabler in supply chain management, especially in manufacturing, shipping, and retail industries, as well as in building security installations, healthcare facilities, libraries, airports, warehouses etc.

RFID tags typically include a memory device for storing various items of information. In an agreement with the Automotive Industry, EPCglobal provided a definition to a previously undefined bit within the Protocol Control (PC) bits of a Gen 2-type tag memory word. The previously defined bit is bit 15 (hex) of tag memory bank 01 (also known as "EPC memory"). The new definition of this bit indicates whether or not any data is currently stored in tag memory bank 11 (also known as "user memory"). This bit is also referred to as a "user memory flag." A "1" logic value for this bit indicates that user memory stores data. A "0" logic value for this bit indicates that user memory stores no data. In light of this new bit definition, two write operations will be required to write data into user memory of a tag. These write operations occur over two separate communications between a reader and the tag. A first write is required to write the data into user memory (memory bank 11), and a second write is required to set bit 15 (hex) of EPC memory (memory bank 01). The first and second write operations can occur in either order.

Because two write operations are required to different memory banks, the possibility exists that if the second write operation fails (for example, because the tag moved out of range of the reader), the user memory flag will not correctly indicate the state of user memory. For example, if the user memory flag is set by the first write operation, and the second write operation fails to write data into a previously-empty user memory, then the user memory flag will incorrectly indicate the presence of user data when no valid data is present. Alternatively, if the first write operation is used to write data into a previously-empty user memory, and the second write operation fails to set the user memory flag, then the user memory flag will incorrectly indicate an "empty" user memory, and the data written into user memory by the first write operation will erroneously be ignored by subsequent readers.

Thus, what is needed are ways to ensure proper writing and clearing of data in user memory of RFID tags.

BRIEF SUMMARY OF THE INVENTION

Methods, systems, and apparatuses for writing data to user memory in tags, and to erasing user memory in tags, are described.

In a first aspect, a write command is received at a tag to write data into user memory of the tag. Based on receipt of the write command, a user memory flag in a first memory bank of the tag is set, and the data is written into a second memory bank of the tag.

In a first aspect, the write command specifies a write of the data into the second memory bank and a set of a bit of the first memory bank that represents the user memory flag. Thus, a single received write command includes write operations with respect to both the first and second memory banks.

In an alternative aspect, receipt of a write command triggers logic of the tag to perform the setting of the user memory flag. Thus, although the write command does not dictate a set of the bit in the first memory bank, logic of the tag causes the bit to be set.

In another aspect, an erase command is received at the tag to erase data stored in the user memory of the tag. Based on receipt of the command to erase, the user memory flag in the first memory bank is cleared, and data stored in the second memory bank is erased.

In another aspect of the present invention, a radio frequency identification (RFID) tag includes an antenna, a memory, a demodulator, and a control logic. The memory includes a first memory bank and a second memory bank. The second memory bank is configured as a user memory. The demodulator is configured to demodulate a communication signal from a RFID reader. The demodulated communication signal includes a write command to write data into user memory of the tag. The control logic is configured to set a user memory flag in the first memory bank and write the data into a second memory bank of the tag based on receipt of the write command.

In a further aspect, the demodulator is further configured to demodulate a reader communication signal that includes a command to erase data stored in the user memory of the tag. The control logic is further configured to clear the user memory flag in the first memory bank and erase data stored in the second memory bank based on receipt of the command to erase.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 8 and 11 shows RFID communication systems, according to example embodiments of the present invention.

Figures 14, 15:
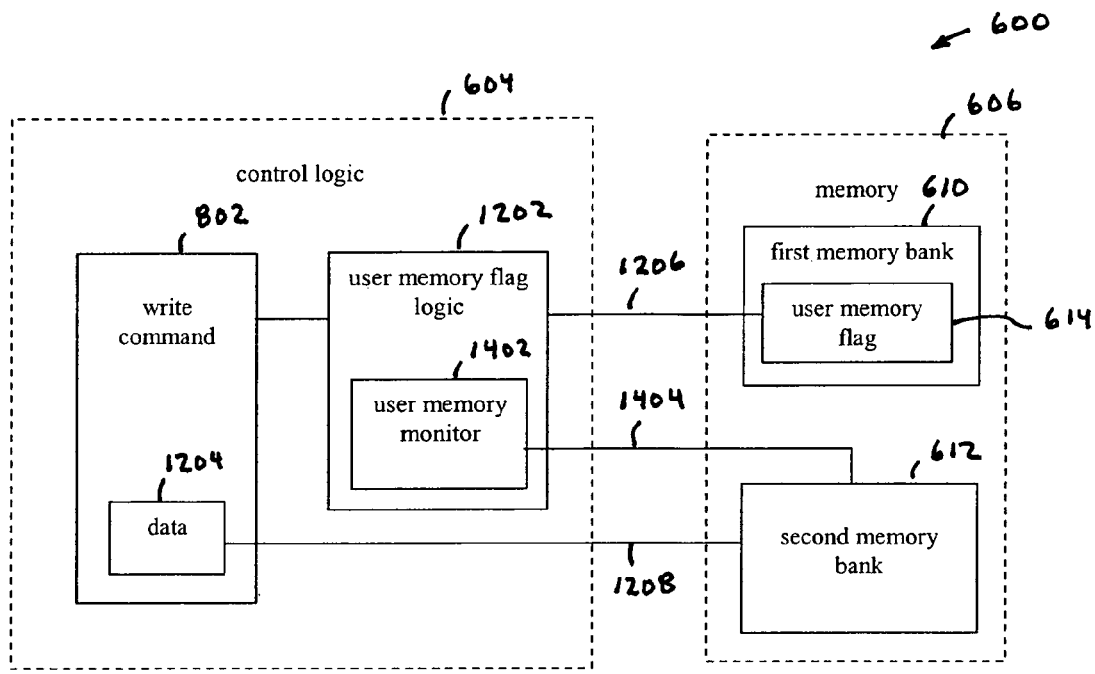

FIGS. 9, 12, and 14 show block diagrams of tags configured to write to user memory, according to example embodiments of the present invention.

FIGS. 10, 13, and 15 show example steps related to writing data to user memory, according to embodiments of the present invention.

Figure 16:
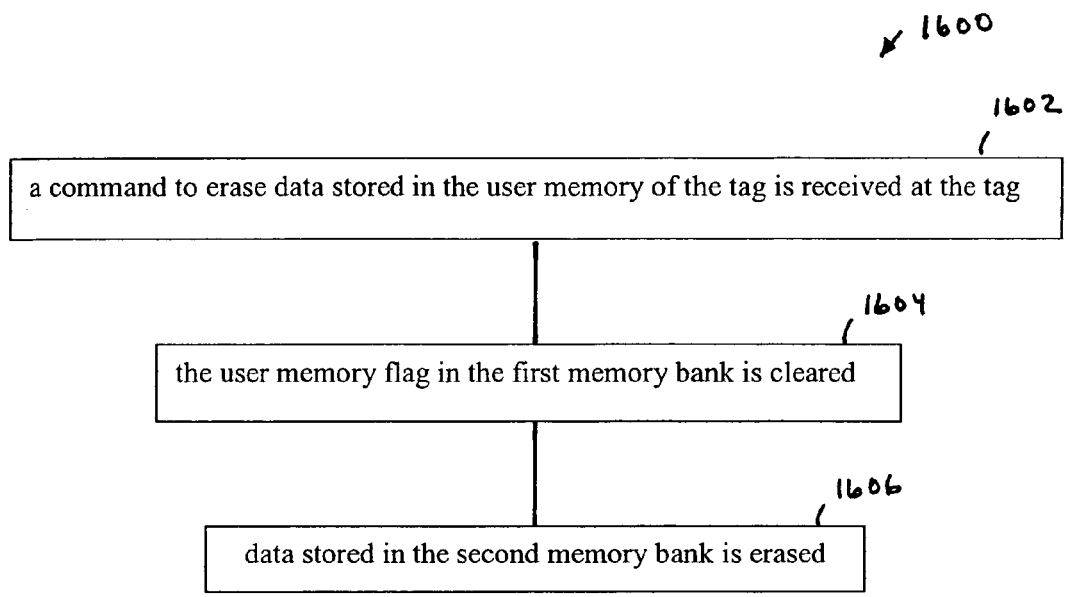

FIG. 16 shows a flowchart for erasing data from user memory in a tag, according to an example embodiment of the present invention.

Figure 17:
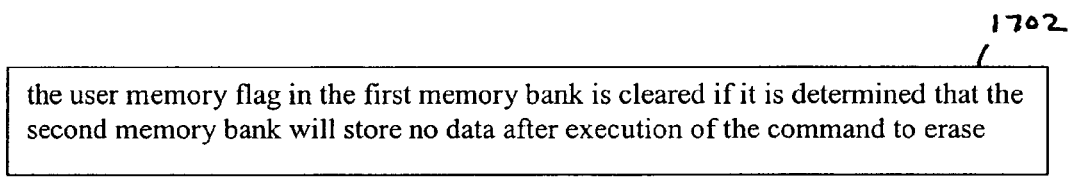

FIG. 17 shows an example step related to erasing data from user memory in a tag, according to an example embodiment of the present invention.

Figure 18:
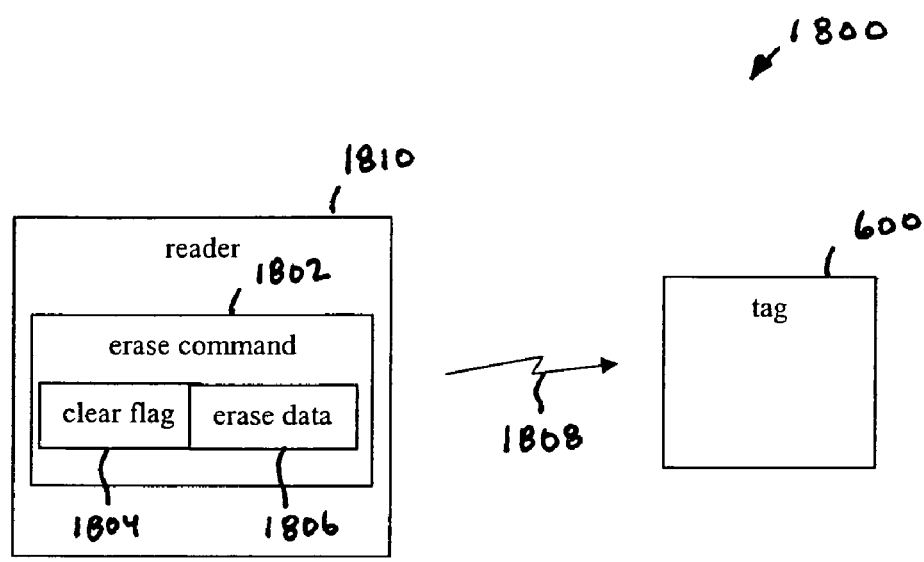
Figure 19:
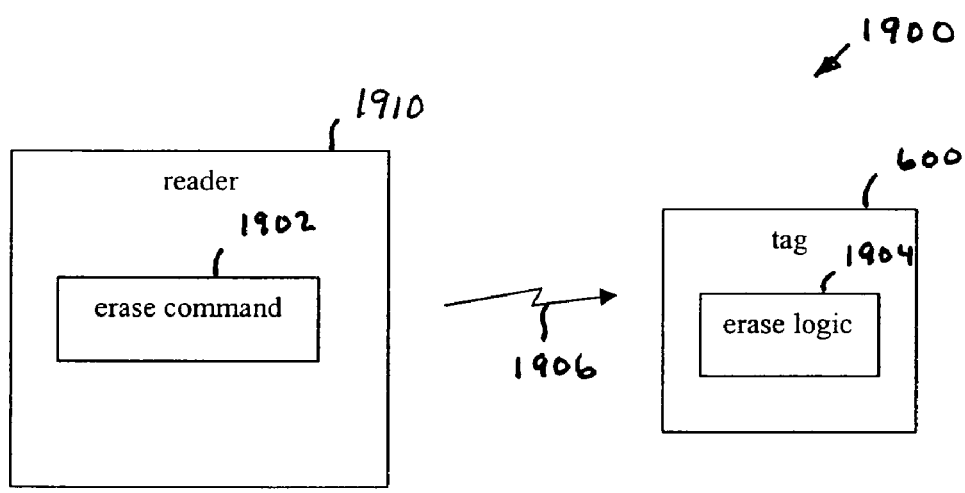

FIGS. 18 and 19 show RFID communication systems, according to example embodiments of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

Methods, systems, and apparatuses for RFID devices are described herein. In particular, methods, systems, and apparatuses for writing data to and erasing data from user memory in tags are described.

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner. Likewise, particular bit values of "0" or "1" (and representative voltage values) are used in illustrative examples provided herein to represent data for purposes of illustration only. Data described herein can be represented by either bit value (and by alternative voltage values), and embodiments described herein can be configured to operate on either bit value (and any representative voltage value), as would be understood by persons skilled in the relevant art(s).

Example RFID System Embodiment

Figure 1:
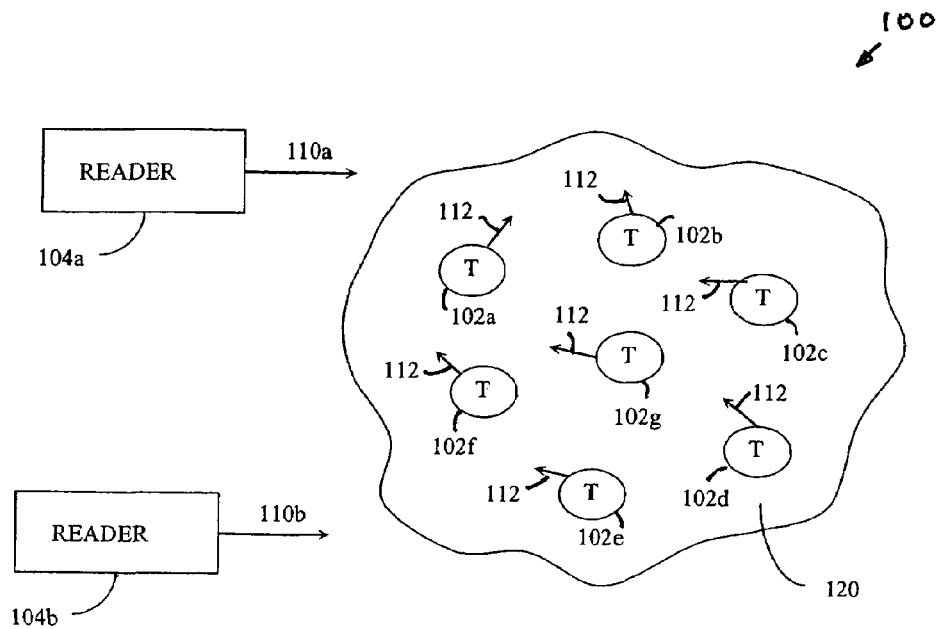
FIG. 1 shows an environment where RFID readers communicate with an exemplary population of RFID tags.

Before describing embodiments of the present invention in detail, it is helpful to describe an example RFID communications environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network.

As shown in FIG. 1, reader 104a transmits an interrogation signal 110a having a carrier frequency to the population of tags 120. Reader 104b transmits an interrogation signal 110b having a carrier frequency to the population of tags 120. Readers 104a and 104b typically operate in one or more of the frequency bands allotted for this type of RF communication. For example, frequency bands of 902-928 MHz and 2400-2483.5 MHz have been defined for certain RFID applications by the Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternatively absorbing and reflecting signal 110 is referred to herein as backscatter modulation. Readers 104a and 104b receive and obtain data from response signals 112, such as an identification number of the responding tag 102. In the embodiments described herein, a reader may be capable of communicating with tags 102 according to any suitable communication protocol, including Class 0, Class 1, EPC Gen 2, other binary traversal protocols and slotted aloha protocols, any other protocols mentioned elsewhere herein, and future communication protocols.

Figure 2:
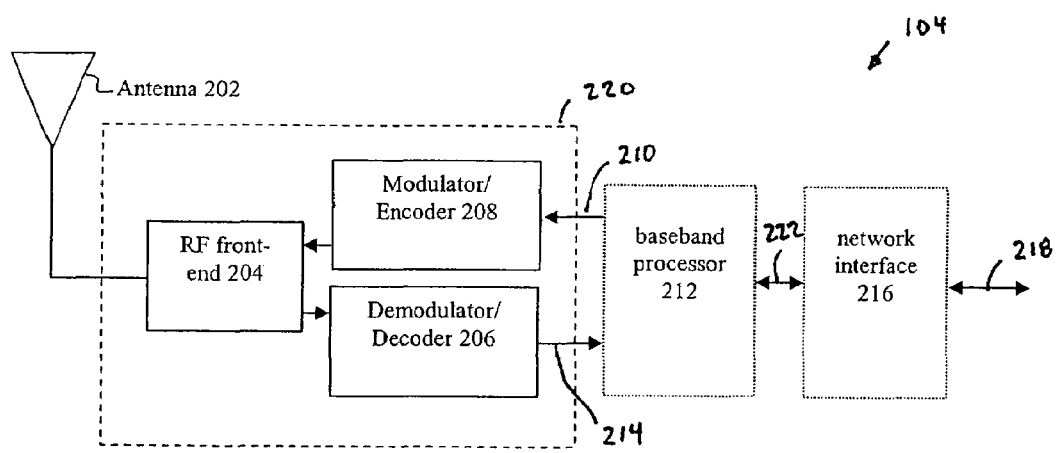
FIG. 2 shows a block diagram of receiver and transmitter portions of an RFID reader.

FIG. 2 shows a block diagram of an example RFID reader 104. Reader 104 includes one or more antennas 202, a receiver and transmitter portion 220 (also referred to as transceiver 220), a baseband processor 212, and a network interface 216. These components of reader 104 may include software, hardware, and/or firmware, or any combination thereof, for performing their functions.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104.

In an embodiment, reader 104 includes network interface 216 to interface reader 104 with a communications network 218. As shown in FIG. 2, baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver 220 transmits the interrogation request via antenna 202.

Reader 104 has at least one antenna 202 for communicating with tags 102 and/or other readers 104. Antenna(s) 202 may be any type of reader antenna known to persons skilled in the relevant art(s), including a vertical, dipole, loop, Yagi-Uda, slot, or patch antenna type. For description of an example antenna suitable for reader 104, refer to U.S. Ser. No. 11/265,143, filed Nov. 3, 2005, titled "Low Return Loss Rugged RFID Antenna," now pending, which is incorporated by reference herein in its entirety.

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In embodiments, network interface 216 enables a wired and/or wireless connection with communications network 218. For example, network interface 216 may enable a wireless local area network (WLAN) link (including a IEEE 802.11 WLAN standard link), a BLUETOOTH link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104.

In the example of FIG. 2, transceiver portion 220 includes a RF front-end 204, a demodulator/decoder 206, and a modulator/encoder 208. These components of transceiver 220 may include software, hardware, and/or firmware, or any combination thereof, for performing their functions. Example description of these components is provided as follows.

Modulator/encoder 208 receives interrogation request 210, and is coupled to an input of RF front-end 204. Modulator/encoder 208 encodes interrogation request 210 into a signal format, such as one of pulse-interval encoding (PIE), FM0, or Miller encoding formats, modulates the encoded signal, and outputs the modulated encoded interrogation signal to RF front-end 204.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214.

The configuration of transceiver 220 shown in FIG. 2 is provided for purposes of illustration, and is not intended to be limiting. Transceiver 220 may be configured in numerous ways to modulate, transmit, receive, and demodulate RFID communication signals, as would be known to persons skilled in the relevant art(s).

Figure 3:
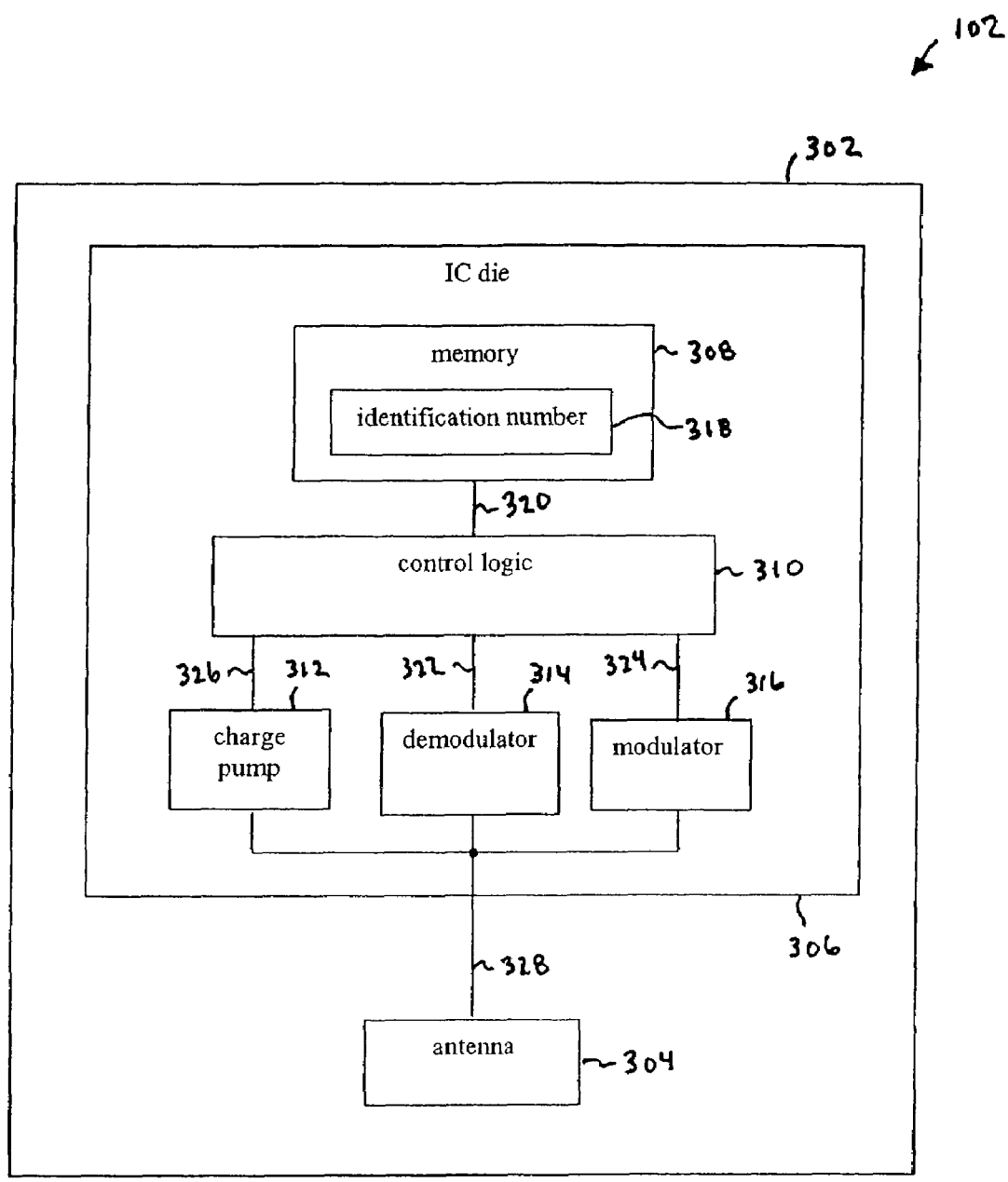
FIG. 3 shows a block diagram of an example radio frequency identification (RFID) tag.

The present invention is applicable to any type of RFID tag. FIG. 3 shows a plan view of an example radio frequency identification (RFID) tag 102. Tag 102 includes a substrate 302, an antenna 304, and an integrated circuit (IC) 306. Antenna 304 is formed on a surface of substrate 302. Antenna 304 may include any number of one, two, or more separate antennas of any suitable antenna type, including dipole, loop, slot, or patch antenna type. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location.

IC 306 controls operation of tag 102, and transmits signals to, and receives signals from RFID readers using antenna 304. In the example of FIG. 3, IC 306 includes a memory 308, a control logic 310, a charge pump 312, a demodulator 314, and a modulator 316. An input of charge pump 312, an input of demodulator 314, and an output of modulator 316 are coupled to antenna 304 by antenna signal 328.

Memory 308 is typically a non-volatile memory, but can alternatively be a volatile memory, such as a DRAM. Memory 308 stores data, including an identification number 318. Identification number 318 typically is a unique identifier (at least in a local environment) for tag 102. For instance, when tag 102 is interrogated by a reader (e.g., receives interrogation signal 110 shown in FIG. 1), tag 102 may respond with identification number 318 to identify itself. Identification number 318 may be used by a computer system to associate tag 102 with its particular associated object/item.

Demodulator 314 is coupled to antenna 304 by antenna signal 328. Demodulator 314 demodulates a radio frequency communication signal (e.g., interrogation signal 110) on antenna signal 328 received from a reader by antenna 304. Control logic 310 receives demodulated data of the radio frequency communication signal from demodulator 314 on input signal 322. Control logic 310 controls the operation of RFID tag 102, based on internal logic, the information received from demodulator 314, and the contents of memory 308. For example, control logic 310 accesses memory 308 via a bus 320 to determine whether tag 102 is to transmit a logical "1" or a logical "0" (of identification number 318) in response to a reader interrogation. Control logic 310 outputs data to be transmitted to a reader (e.g., response signal 112) onto an output signal 324. Control logic 310 may include software, firmware, and/or hardware, or any combination thereof. For example, control logic 310 may include digital circuitry, such as logic gates, and may be configured as a state machine in an embodiment.

Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112, which is received by reader 104. In an embodiment, modulator 316 includes a switch, such as a single pole, single throw (SPST) switch. The switch changes the return loss of antenna 304. The return loss may be changed in any of a variety of ways. For example, the RF voltage at antenna 304 when the switch is in an "on" state may be set lower than the RF voltage at antenna 304 when the switch is in an "off" state by a predetermined percentage (e.g., 30 percent). This may be accomplished by any of a variety of methods known to persons skilled in the relevant art(s).

Charge pump 312 (or other type of power generation module) is coupled to antenna 304 by antenna signal 328. Charge pump 312 receives a radio frequency communication signal (e.g., a carrier signal transmitted by reader 104) from antenna 304, and generates a direct current (DC) voltage level that is output on tag power signal 326. Tag power signal 326 is used to power circuits of IC die 306, including control logic 320.

Charge pump 312 may be present in a passive tag to rectify the radio frequency communication signal of antenna signal 328 to create a voltage level. Furthermore, charge pump 312 increases the created voltage level to a level sufficient to power circuits of IC die 306. Charge pump 312 may also include a regulator to stabilize the voltage of tag power signal 326. Charge pump 312 may be configured in any suitable way known to persons skilled in the relevant art(s). For description of an example charge pump applicable to tag 102, refer to U.S. Pat. No. 6,734,797, titled "Identification Tag Utilizing Charge Pumps for Voltage Supply Generation and Data Recovery," which is incorporated by reference herein in its entirety. Alternative circuits for generating power in a tag, as would be known to persons skilled in the relevant art(s), may be present. In active tags, a battery device may be present. Further description of charge pump 312 is provided below.

It will be recognized by persons skilled in the relevant art(s) that tag 102 may include any number of modulators, demodulators, charge pumps, and antennas. Tag 102 may additionally include further elements, including an impedance matching network and/or other circuitry. Furthermore, although tag 102 is shown in FIG. 3 as a passive tag, tag 102 may alternatively be an active tag (e.g., powered by battery).

Figure 4:
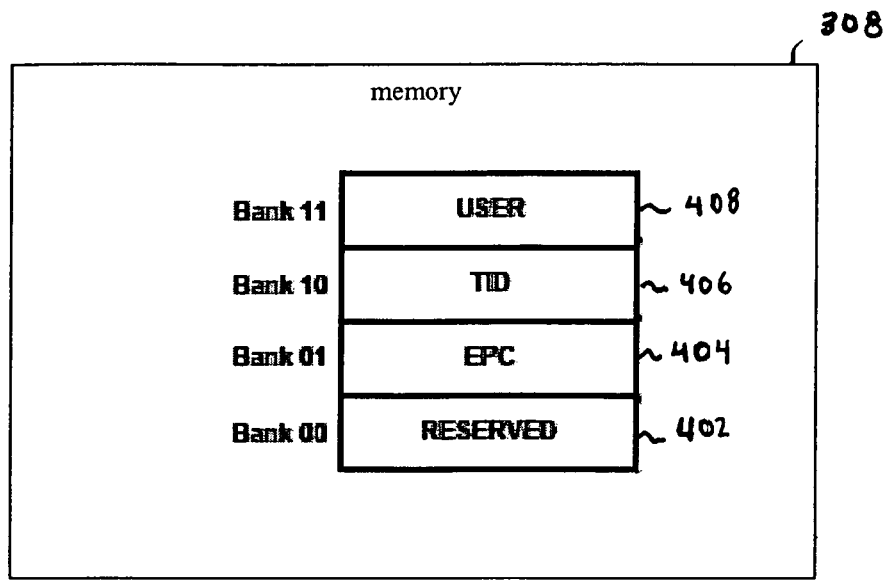
FIGS. 4 and 5 show locations in a memory of a Gen 2-type RFID tag.

Memory 308 may have a variety of logical structures. FIG. 4 shows a logical representation of memory 308 in an example Gen 2-type RFID tag. As shown in FIG. 4, memory 308 is logically separated into first-fourth memory banks 402, 404, 406, and 408, each of which may store zero or more memory words.

First memory bank 402 may be referred to as "reserved memory" or "memory bank 00." Memory bank 402 stores kill and access passwords.

Figure 5:
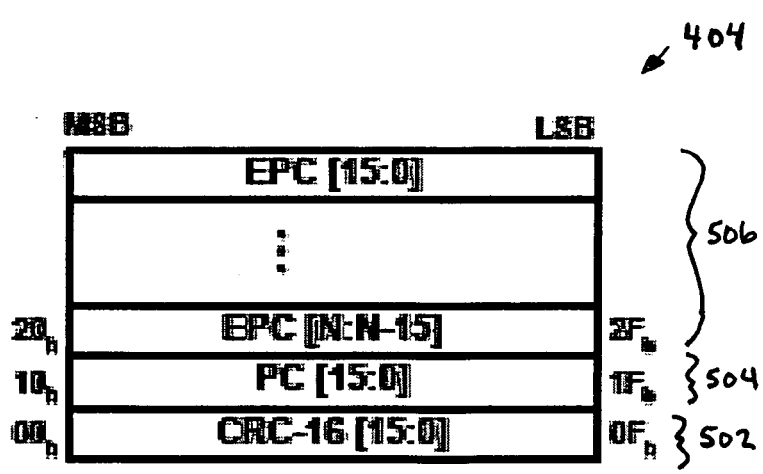

Second memory bank 404 may be referred to as "EPC memory" or "memory bank 01." FIG. 5 shows further detail of memory bank 404 in a Gen 2-type tag. In a first memory portion 502 at memory addresses 00hex to 0Fhex of memory bank 404, a 16 bit cyclic redundancy check (CRC) checksum ("CRC-16") is stored. In a second memory portion 504 at memory addresses 10hex to 1Fhex of memory bank 404, Protocol-Control (PC) bits are stored. In a third memory portion 506 beginning at 20hex of memory bank 404, a code is stored (such as an electronic product code (EPC)) that identifies the object to which the tag is associated.

Third memory bank 406 may be referred to as "TID memory" or "memory bank 10." Memory bank 406 stores an 8-bit ISO/IEC 15963 allocation class identifier (111000102 for EPCglobal) at memory locations 00hex to 07hex. Memory bank 406 further includes sufficient identifying information above 07hex for a reader to uniquely identify the custom commands and/or optional features that a tag supports.

Fourth memory bank 408 may be referred to as "user memory" or "memory bank 11." Memory bank 408 stores user-specific data. The organization of memory bank 408 is user-defined.

Further description of memory banks 402-408 in a Gen 2-type tag can be found in "EPC™ Radio-Frequency Identity Protocols, Class-1 Generation-2 UHF RFID, Protocol for Communications at 860 MHz-960 MHz," Version 1.0.9, EPCglobal, Inc., copyright 2004, dated Jan. 1, 2005, pages 1-94, which is incorporated by reference herein in its entirety.

With regard to memory bank 404, memory locations 15hex and 16hex of the PC bits were initially reserved for future use (RFU). In an agreement with the Automotive Industry, EPCglobal provided a definition to bit 15hex of memory bank 404, such that the bit indicates whether or not any data is currently stored in fourth memory bank 408. This bit is also referred to as a "user memory flag." A "1" logic value for this bit indicates that memory bank 408 stores data. A "0" logic value for this bit indicates that memory bank 408 stores no data. In conventional systems, a reader performs two separate write operations (over two separate wireless communications) to write to user memory in a tag. Using a first write command, the reader writes the data to memory bank 408 (user memory). Using a second write command, the reader writes a "1" to memory bank 404, to set bit 15hex (the user memory flag). The write commands can occur in either order. As described above, a failure in either write command may lead to an error with regard to subsequent access of the data in user memory. In a similar manner, a reader performs two separate operations to erase user memory in a tag. A failure in either operation will lead to an error with regard to subsequent access of user memory.

As further described below, according to embodiments of the present invention, tag user memory is written to and erased, while properly maintaining a value of a tag user memory flag. Embodiments of the present invention are described in further detail below. Such embodiments may be implemented in the environments, readers, and tags described above, and/or in alternative environments and alternative RFID devices.

Example Embodiments for Writing Data and Erasing Data in Tag User Memory

Example embodiments are described herein for writing and erasing data in tag user memory. These embodiments can be implemented in a variety of types of tags and readers, and can be implemented in a variety of RFID environments. For example, embodiments may be implemented in 18000-6C (aka Gen 2) tags, whether they contain EPCglobal or AFI data structures. Furthermore, embodiments can be implemented in a commercial or industrial environment, such as in a warehouse, a factory, a business, or store, and in a military or other non-commercial environment.

These examples are provided for illustrative purposes, and are not limiting. The examples described herein may be adapted to any type of tag. Further structural and operational embodiments, including modifications/alterations, will become apparent to persons skilled in the relevant art(s) from the teachings herein.

Figure 6:
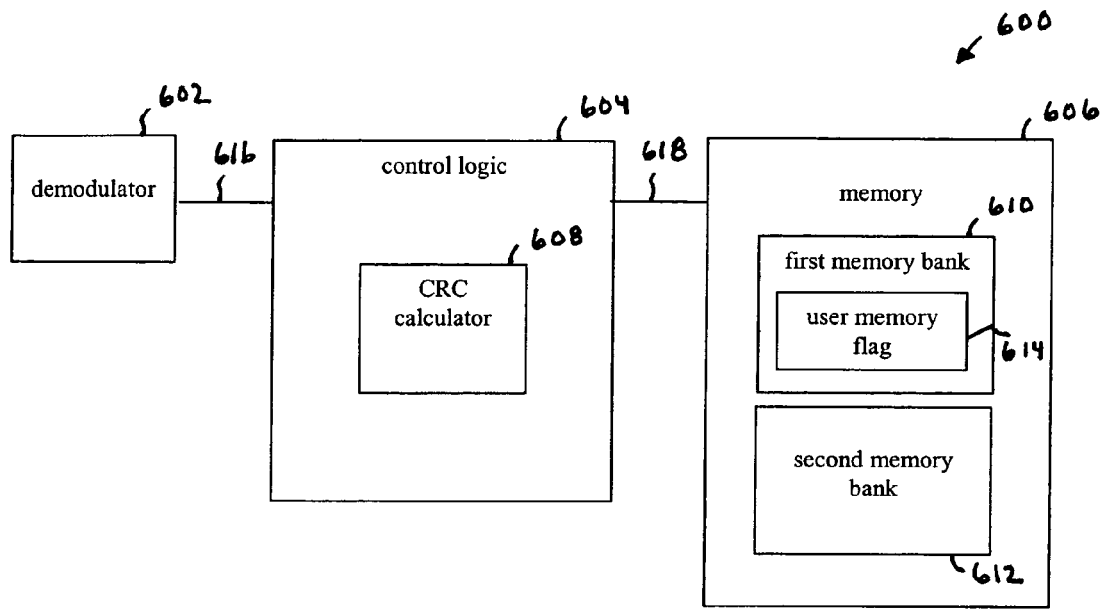
FIG. 6 shows a block diagram of a tag configured to write to user memory, according to an example embodiment of the present invention.

FIG. 6 shows a block diagram of a portion of a tag 600 configured according to an example embodiment of the present invention. As shown in FIG. 6, tag 600 includes a demodulator 602, control logic 604, and memory 606. Elements of tag 600 named similarly to elements of tag 102 of FIG. 3 function similarly to those elements of tag 102, and thus are not described below in full detail for purposes of brevity.

Demodulator 602 is configured to demodulate a RFID communications signal transmitted by a reader and received by an antenna (not shown in FIG. 6) of tag 600, and to output a demodulated reader signal 616. Control logic 604 receives demodulated reader signal 616, and processes an instruction/data of demodulated signal 616. For example, the instruction/data of demodulated signal 616 may be a write command or an erase command relating to user memory in memory 606 of tag 600. As shown in FIG. 6, memory 606 includes a first memory bank 610 and a second memory bank 612. Second memory bank 612 includes memory space for user memory, which is user defined memory space. For example, memory bank 612 may be memory bank 408 (user memory) as described above for an EPC Gen 2-type tag, or may be user memory of another type of tag. First memory bank 610 includes a user memory flag 614. User memory flag 614 is used to indicate whether second memory bank 612 stores data. For example, user memory flag 614 may be bit 15 hex of memory bank 404 (EPC memory) as described above with respect to FIG. 4 for an EPC Gen 2-type tag, or may be a user memory flag for another type of tag.

Control logic 604 is configured to receive a write command from a reader from demodulator 602. Control logic 604 accesses memory 606 over signal 618. Based on receipt of the write command, control logic 604 is configured to set user memory flag 614 in first memory bank 610 and write data into second memory bank 612 of tag 600. Control logic 604 is further configured to receive an erase command from a reader from demodulator 602. Based on receipt of the erase command, control logic 604 is configured to clear user memory flag 614 in first memory bank 610 (if first memory bank 610 will be completely erased of data by the erase command) and to erase data stored second memory bank 612 of tag 600.

Figure 7:
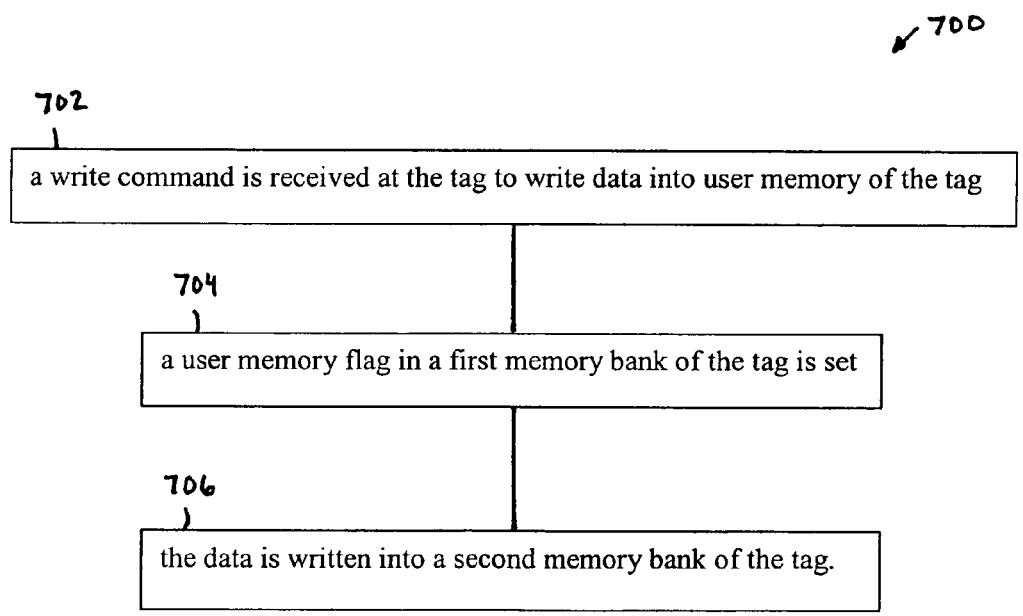
FIG. 7 shows a flowchart for writing to user memory in a tag, according to an example embodiment of the present invention.

FIG. 7 shows a flowchart 700 providing example steps for tag 600 to write to user memory, according an embodiment of the present invention. Other structural and operational embodiments will be apparent to persons skilled in the relevant art(s) based on the following discussion. Steps 704 and 706 of flowchart 700 can occur in either order, or may overlap.

Flowchart 700 begins with step 702. In step 702, a write command is received at the tag to write data into user memory of the tag. For example, in an embodiment, the tag is tag 600, and the user memory is second memory bank 612 of tag 600. The write command is received by demodulator 602 from a reader, and demodulator 602 outputs demodulated reader signal 616 (containing the write command) to control logic 604. In a Gen 2 environment, the write command may be a Gen 2 "write" or "write block" command, for example, or may be a Gen 2 "custom" command. In alternative types of RFID communication environment, the write command may have other forms.

In step 704, a user memory flag in a first memory bank of the tag is set. For example, in an embodiment, user memory flag 614 is set in first memory bank 610. In one embodiment, only the bit (or bits) of user memory flag 614 is set. In another embodiment, additional bits, or the entire contents of first memory bank 610 are overwritten (e.g., by data for memory bank 610 received in the write command from the reader, and/or by data generated by control logic 604) when user memory flag 614 is set.

In step 706, the data is written into a second memory bank of the tag. For example, in an embodiment, data supplied with the write command is written into second memory bank 612.

Note that as shown in FIG. 6, control logic 604 may optionally include CRC calculator 608. CRC calculator 608, when present, is configured to perform a CRC calculation of bits stored in first memory bank 610 to account for the setting of user memory flag 614. In other words, setting user memory flag 614 may change a CRC checksum (such as present in first memory portion 502 of memory bank 404 shown in FIG. 5) stored in first memory bank 610. Thus, CRC calculator 608 calculates a new value for the CRC checksum value. The newly calculated CRC value may be stored in first memory bank 610. Thus, in an embodiment, flowchart 700 may optionally include the further step of performing a cyclic redundancy check (CRC) of bits stored in the first memory bank to account for the setting of the user memory flag.

FIG. 8 shows a RFID communication system 800, according to an embodiment of the present invention. As shown in FIG. 8, a reader 810 includes a write command 802. Write command 802 includes an extension such that write command 802 causes a write to at least portions of two or more tag memory banks simultaneously. This is different from conventional systems, where separate communications are required to provide write commands for different tag memory banks. As shown in FIG. 8, write command 802 includes a "set flag" command 804 and a "write data" command 806, which are transmitted by reader 810 to tag 600 in a single RFID communication signal 808. Thus, in a Gen 2 embodiment, write command 802 may be a "custom" command, configured to provide both operations in a single command.

For example, FIG. 9 shows a block diagram providing further detail of tag 600, according to one embodiment of the present invention. As shown in FIG. 9, control logic 604 receives write command 802 from a demodulator (e.g., demodulator 602, not shown in FIG. 9). Write command 802 enables a write to both of first and second memory banks 610 and 612. Control logic 604 processes write command 802 to perform both of steps 704 and 706 of flowchart 700. Based on receipt of set flag command 804 in write command 802, control logic 604 performs a set of user memory flag 614 according to a first write operation 902. Based on receipt of write data command 806 in write command 802, control logic 604 performs a write of data to second memory bank 612 according to a second write operation 904, both occurring internal to tag 600. First and second write operations 902 and 904 can occur in either order or in an overlapping fashion.

Thus, in the embodiment of FIGS. 8 and 9, step 702 of flowchart 700 may include step 1002 shown in FIG. 10. In step 1002, a write command is received that specifies a write of the data into the second memory bank and a set of a bit of the first memory bank that represents the user memory flag. Thus, a single write command 802 causes the write of data into second memory bank 612 and the setting of user memory flag 614 in first memory bank 610. This has a benefit over conventional systems, where separate write commands are required to write to the two memory banks, causing user memory write operations to take longer, and to be prone to error (as described above).

Note that in embodiments, write command 802 can be configured to write only to user memory and set user memory flag 614, or additional memory locations/banks could be written. For example, write command 802 may specify additional data sets, including four data sets, where additional memory banks could be written. For instance, in an embodiment, data may be written to any number or portion of the memory banks of memory 308 shown in FIG. 4, including all four of memory banks 402-408.

FIG. 11 shows a RFID communication system 1100, according to an embodiment of the present invention. As shown in FIG. 11, a reader 1110 includes a write command 1102. Write command 1102 is a conventional type of write command, where separate communications are required to provide write commands directed to different tag memory banks. Thus, in a Gen 2 embodiment, write command 1102 may be a "write" or "write block" command. However, tag 600 of system 1100 includes write logic 1104. Write logic 1104 enables data to be written to two (or more) memory banks of tag 600 upon receipt of a single write command 1102. As shown in FIG. 11, write command 1102 is transmitted from reader 1110 to tag 600 in RFID communication signal 1108.

For example, FIG. 12 shows a block diagram providing further detail of tag 600, according to another embodiment of the present invention. As shown in FIG. 12, control logic 604 receives write command 1102 from a demodulator (e.g., demodulator 602, not shown in FIG. 12). Control logic 604 includes a user memory flag logic 1202. User memory flag logic 1202 enables a write to both of first and second memory banks 610 and 612 upon receipt of write command 1102. Control logic 604 processes write command 1102 to perform step 706 of flowchart 700, so that data 1204 of write command 1102 is written to second memory bank 612 according to a write operation 1208. Furthermore, user memory flag logic 1202 processes write command 1102 to perform step 704 of flowchart 700, such that a set of user memory flag 614 is performed according to a write operation 1206.

In an embodiment, user memory flag logic 1202 decodes write command 1102 to determine if a write to user memory is requested. For example, in a Gen 2-type tag embodiment, user memory flag logic 1202 may determine whether write command 1102 includes a write to a "11" memory bank, which is user memory. If write command 1102 includes a write to user memory, user memory flag logic 1202 determines that user memory flag 614 should be set. In such situation, user memory flag logic 1202 causes user memory flag 614 to be set in first memory bank 610.

Thus, based upon receipt of write command 1102, user memory flag 614 is set according to first write operation 1206, and data is written to second memory bank 612 according to second write operation 1208, both occurring internal to tag 600. First and second write operations 1206 and 1208 can occur in either order or in an overlapping fashion.

Therefore, in the embodiment of FIGS. 11 and 12, step 702 of flowchart 700 may include step 1302 shown in FIG. 13. In step 1302, receipt of the data for user memory causes logic of the tag to perform the step 702. Thus, a single write command 1102 causes the write of data into second memory bank 612 and the setting of user memory flag 614 in first memory bank 610. Again, this has a benefit over conventional systems, where separate write commands are required to write to the two memory banks, causing user memory write operations to take longer, and to be prone to error (as described above).

Another benefit of the embodiments of FIGS. 11 and 12 is that compatibility with standard Gen 2 readers is maintained. Such standard Gen 2 readers may still use two write commands to write to the EPC and user memory banks, as they may be unaware that the separate write to the EPC memory bank (to set user memory flag 614) is unneeded in tag 600, because it is performed by user memory flag logic 1202. Tag 600 of FIG. 12 provides enhanced security, keeping user memory flag 614 consistent with the state of user memory, even if the write operation to the EPC memory bank by the standard Gen 2 reader fails.

Note that in an embodiment, logic may be present in a tag to detect whether user memory was empty prior to setting user memory flag 614. In such an embodiment, user memory flag 614 may be set only when this condition is met. For example, FIG. 14 shows an example of such an embodiment for tag 600 of FIG. 12. In FIG. 12, user memory flag logic 1202 includes user memory monitor 1402. When user memory flag logic 1202 determines that a write command for user memory is received, prior to writing the data to user memory, user memory monitor 1402 checks user memory (e.g., second memory bank 612) to determine whether data already resides in any portion of user memory. If user memory monitor 1402 determines that data does not reside in user memory, user memory flag logic 1202 sets user memory flag 614. If data does reside in user memory, user memory flag logic 1202 does not set user memory flag 614, as it is assumed that user memory flag 614 was previously set.

Thus, in such an embodiment, step 704 of flowchart 700 may include step 1502 shown in FIG. 15. In step 1502, the user memory flag in the first memory bank is set if it is determined that the second memory bank stores no data prior to step 706.

In an embodiment, user memory monitor 1402 checks second memory bank 612 by determining whether any non-zero bits are present in second memory bank 612. If non-zero bits are present, it is determined that data is stored in second memory bank 612. If second memory bank 612 stores all zero bits, then user memory monitor 1402 determines that second memory bank 612 is empty of data. In another embodiment, user memory monitor 1402 tracks the writing and erasing of data to locations in second memory bank 612 to monitor whether data resides in second memory bank 612 at any particular time. User memory monitor 612 may alternatively be configured in other ways to determine whether data resides in user memory, as would be known to persons skilled in the relevant art(s).

Note that the embodiments for tag 600 of FIGS. 9 and 12 can be combined in tag 600. In other words, tag 600 can be configured to receive write command 802 having a set flag command 804 and a write data command 806, and tag 600 may include user memory flag logic 1202. Thus, upon receipt of write command 802, tag 600 is configured to write data to second memory bank 612 and to set user memory flag 614, as described above with respect to FIG. 9. Furthermore, user memory flag logic 1202 causes user memory flag 614 to be set, as described above with respect to FIG. 12. In such an embodiment, a tag 600 is provided that can be written to quickly using the extended write command (write command 802), and yet provides robust operation with respect to user memory flag 614, even with readers that do not use the extended write command.

In a similar fashion as with write commands, tag 600 may configured to handle erase commands with respect to user memory. FIG. 16 shows a flowchart 1600 providing example steps for tag 600 to erase data from user memory, according an embodiment of the present invention. Other structural and operational embodiments will be apparent to persons skilled in the relevant art(s) based on the following discussion. Steps 1604 and 1606 of flowchart 1600 can occur in either order, or may overlap.

Flowchart 1600 begins with step 1602. In step 1602, a command to erase data stored in the user memory of the tag is received at the tag. For example, in an embodiment, the user memory is second memory bank 612 of tag 600. An erase command is received by demodulator 602 from a reader, and demodulator 602 outputs demodulated reader signal 616 (containing the erase command) to control logic 604. In a Gen 2 environment, the erase command may be a Gen 2 "erase block" command, for example. In alternative types of RFID communication environment, the erase command may have other forms.

In step 1604, the user memory flag in the first memory bank is cleared. For example, in an embodiment, user memory flag 614 is cleared (e.g., set to "0") in first memory bank 610. In one embodiment, only the bit (or bits) of user memory flag 614 is cleared. In another embodiment, additional bits, or the entire contents of first memory bank 610 are overwritten (e.g., by appropriate data received in the write command from the reader, and/or by data generated by control logic 604) when user memory flag 614 is cleared.

In step 1606, data stored in the second memory bank is erased. For example, in an embodiment, locations in second memory bank 612 specified in the received erase command are erased (e.g., replaced with "0" data values).

Note that in an embodiment, prior to performing step 1604, it is determined whether the second memory bank will store no data after execution of the command to erase. For example, if second memory bank 612 will still store data in some portion after the erase command is executed, then step 1604 should not be performed, because data still resides in user memory. If second memory bank 612 will not store data in some portion after the erase command is executed, then 1604 should be performed, because user memory is empty. In an embodiment, user memory monitor 1402 (of FIG. 14) may be present and configured to determine whether second memory bank 612 will store any data after execution of an erase command. Alternatively, this determination may be made in other ways, as would be known to persons skilled in the relevant art(s).

FIGS. 18 and 19 show example RFID communication systems 1800 and 1900, according to embodiments of the present invention. As shown in FIG. 18, reader 1810 includes an erase command 1802. Erase command 1802 includes an extension such that erase command 1802 causes tag 600 to operate on at least portions of two or more tag memory banks simultaneously. This is different from conventional systems, where separate communications are required to handle an erase command, which affects different tag memory banks. Conventionally, a first communication is directed to a first memory bank, where the user memory flag may be cleared in the first memory bank, and a second communication is directed to the second memory bank, where memory locations are erased.

As shown in FIG. 18, erase command 1802 includes a "clear flag" command 1804 and an "erase data" command 1806, which are transmitted by reader 1810 to tag 600 in a single RFID communication signal 1808. In a Gen 2 embodiment, erase command 1802 may be a "custom" command. Similarly to the configuration shown in FIG. 9 for handling write command 802, tag 600 may be configured to handle erase command 1802. For example, control logic 604 can be configured to process erase command 1802 to perform both of steps 1604 and 1606 of flowchart 1600. Based on clear flag command 1804, control logic 604 performs a clear of user memory flag 614. Based on erase data command 1806, control logic 604 performs an erase of memory locations in second memory bank 612. The clear and erase operations can occur in either order or in an overlapping fashion.

As shown in FIG. 19, reader 1910 includes an erase command 1902. Erase command 1902 is a conventional type of erase command, where separate communications are required to erase memory locations in different tag memory banks. Thus, in a Gen 2 embodiment, erase command 1902 may be an "erase block" command, for example. However, tag 600 of system 1900 includes erase logic 1904. Erase logic 1904 enables two (or more) memory banks of tag 600 to be interacted with upon receipt of a single erase command 1902. As shown in FIG. 19, erase command 1902 is transmitted from reader 1910 to tag 600 in RFID communication signal 1906.

Similarly to the configuration shown in FIG. 12 for handling write command 1102, tag 600 may be configured to configured to handle erase command 1902. For example, control logic 604 may include erase logic 1904. Erase logic 1904 enables the clearing of user memory flag 614 in first memory bank 610 and erasing of memory locations in second memory bank 612 upon receipt of write command 1902. Control logic 604 processes write command 1902 to perform step 1606 of flowchart 1600, so that memory locations specified in erase command 1902 are erased in second memory bank 612. Furthermore, erase logic 1904 processes erase command 1902 to perform step 1604 of flowchart 1600, such that a clear of user memory flag 614 is performed. For example, erase logic 1904 may decode erase command 1902 to determine whether an erase of one or more memory locations in user memory is requested.

In an embodiment, CRC calculator 608 shown in FIG. 6, when present, is configured to perform a CRC calculation of bits stored in first memory bank 610 to account for the clearing of user memory flag 614. In other words, clearing user memory flag 614 may change a CRC checksum (such as present in first memory portion 502 of memory bank 404 shown in FIG. 5) stored in first memory bank 610. Thus, CRC calculator 608 calculates a new value for the CRC checksum value. The newly calculated CRC value may be stored in first memory bank 610. Thus, in an embodiment, flowchart 700 may optionally include the further step of performing a cyclic redundancy check (CRC) of bits stored in the first memory bank to account for the clearing of the user memory flag.

Example Computer System Embodiments

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention are implemented using software, the software may be stored in a computer program product and loaded into a computer system (e.g., a reader) using a removable storage drive, hard drive, or communications interface. The control logic (software), when executed by a processor, causes the processor to perform the functions of the invention as described herein.

According to an example embodiment, a reader may execute computer-readable instructions to command a tag to write data to user memory or to erase data from user memory. Furthermore, in an embodiment, a tag may execute computer-readable instructions to perform a write or erase of data in user memory, as further described elsewhere herein.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for writing data into user memory of a radio frequency identification (RFID) tag, comprising:
   receiving at the tag a write command to write data into user memory of the tag;
   based on receipt of the write command, the tag performing the steps of:
      setting a user memory flag in a first memory bank of the tag; and
      writing the data into a second memory bank of the tag; and
   performing a cyclic redundancy check (CRC) of bits stored in the first memory bank that includes the state of the user memory flag.

2. The method of claim 1, wherein the tag is a Gen 2 tag, wherein the first memory bank is an Electronic Product Code (EPC) memory bank, wherein said setting step comprises setting bit 15 hex of the EPC memory bank.

3. The method of claim 1, wherein said receiving step comprises:
   receiving a write command that specifies a write of the data into the second memory bank and a set of a bit of the first memory bank that represents the user memory flag.

4. The method of claim 3, wherein the write command further specifies a write of additional data into at least one of a third memory bank or a fourth memory bank of the tag, wherein said writing step comprises:
   writing the additional data into at least one of the third memory bank or fourth memory bank.

5. The method of claim 3, wherein the write command further specifies a write of additional data into the first memory bank, wherein said writing step comprises:
   writing the additional data into the first memory bank.

6. The method of claim 1, wherein the write command includes the data for user memory, wherein receipt of the data for user memory causes logic of the tag to perform the setting step.

7. The method of claim 6, wherein the logic performs the setting step prior to the writing step being performed.

8. The method of claim 6, wherein the logic performs the setting step after the writing step is performed.

9. The method of claim 1, further comprising:
   determining whether the second memory bank stores no data prior to the writing step; wherein said setting step comprises:
   setting the user memory flag in the first memory bank if it is determined that the second memory bank stores no data prior to the writing step.

10. The method of claim 1, further comprising:
    receiving at the tag a command to erase data stored in the user memory of the tag;
    based on receipt of the command to erase, performing the steps of:
       clearing the user memory flag in the first memory bank; and
       erasing data stored in the second memory bank.

11. The method of claim 1, further comprising:
    receiving at the tag a command to erase data stored in the user memory of the tag;
    based on receipt of the command to erase, performing the steps of:
       determining whether the second memory bank will store no data after execution of the command to erase;
       clearing the user memory flag in the first memory bank if it is determined that the second memory bank will store no data after execution of the command to erase; and
       erasing data stored in the second memory bank specified in the command to erase.

12. A radio frequency identification (RFID) tag, comprising:
    means for receiving at the tag a write command to write data into user memory of the tag;
    means for setting a user memory flag in a first memory bank of the tag in response to receiving the write command;
    means for writing the data into a second memory bank of the tag in response to receiving the write command; and
    means for performing a cyclic redundancy check (CRC) of bits stored in the first memory bank that includes the state of the user memory flag.

13. The tag of claim 12, further comprising:
    means for receiving at the tag a command to erase data stored in the user memory of the tag;
    means for clearing the user memory flag in the first memory bank in response to receiving the command to erase; and
    means for erasing data stored in the second memory bank in response to receiving the command to erase.

14. A radio frequency identification (RFID) tag, comprising:
    an antenna;
    a memory that includes a first memory bank and a second memory bank, wherein the second memory bank is configured as a user memory;
    a demodulator configured to demodulate a communication signal from a RFID reader, wherein the demodulated communication signal includes a write command to write data into user memory of the tag;
    first control logic configured to set a user memory flag in the first memory bank and write the data into a second memory bank of the tag based on receipt of the write command; and
    second control logic configured to perform a cyclic redundancy check (CRC) of bits stored in the first memory bank that includes the state of the user memory flag.

15. The tag of claim 14, wherein the tag is a Gen 2 tag, wherein the first memory bank is an Electronic Product Code (EPC) memory bank, wherein the user memory flag is bit 15 hex of the EPC memory bank.

16. The tag of claim 14, wherein the write command specifies a write of the data into the second memory bank and a set of a bit of the first memory bank that represents the user memory flag.

17. The tag of claim 16, wherein the write command further specifies a write of additional data into at least one of a third memory bank or a fourth memory bank of the tag.

18. The tag of claim 16, wherein the write command further specifies a write of additional data into the first memory bank.

19. The tag of claim 14, wherein the write command includes the data for user memory, wherein the first control logic includes a logic module configured to set the user memory flag upon receipt of the data for user memory.

20. The tag of claim 19, wherein the logic module is configured to set the user memory flag prior to the data being written into the second memory bank.

21. The tag of claim 19, wherein the logic module is configured to set the user memory flag after the data is written into the second memory bank.

22. The tag of claim 19, wherein the logic module is configured to determine whether the second memory bank stores no data prior to the data being written into the second memory bank, and the logic module is configured to set the user memory flag in the first memory bank if the logic module determined that the second memory bank stores no data prior to the writing step.

23. The tag of claim 14, wherein the demodulator is further configured to demodulate a reader communication signal that includes a command to erase data stored in the user memory of the tag; and
   wherein the first control logic is further configured to clear the user memory flag in the first memory bank and erase data stored in the second memory bank based on receipt of the command to erase.

24. The tag of claim 14, wherein the demodulator is further configured to demodulate a reader communication signal that includes a command to erase data stored in the user memory of the tag;
   wherein the first control logic includes a logic module configured to determine whether the second memory bank will store no data after execution of the command to erase, and to clear the user memory flag in the first memory bank if it is determined that the second memory bank will store no data after execution of the command to erase; and
   wherein the first control logic is further configured to erase data stored in the second memory bank specified in the command to erase.

25. The tag of claim 14, further comprising:
   a modulator coupled to the antenna; wherein the modulator is configured to modulate a response to a reader communication signal.

26. The tag of claim 14, further comprising:
   a substrate; and
   an integrated circuit (IC) die mounted to the substrate, wherein the memory, demodulator, and control logic are in the IC die;
   wherein the antenna is formed on the substrate.

* * * * *

UNITED STATES PATENT AND TRADEMARK OFFICE
CERTIFICATE OF CORRECTION

PATENT NO. : 7,663,486 B2
APPLICATION NO. : 11/453928
DATED : February 16, 2010
INVENTOR(S) : Schuessler Page 1 of 1

It is certified that error appears in the above-identified patent and that said Letters Patent is hereby corrected as shown below:

1. In Column 16, Line 21, in Claim 12, delete "for" and insert -- for the tag --, therefor.

2. In Column 16, Line 24, in Claim 12, delete "for" and insert -- for the tag --, therefor.

Signed and Sealed this
Fifteenth Day of November, 2011

David J. Kappos
*Director of the United States Patent and Trademark Office*